United States Patent Office 2,931,822
Patented Apr. 5, 1960

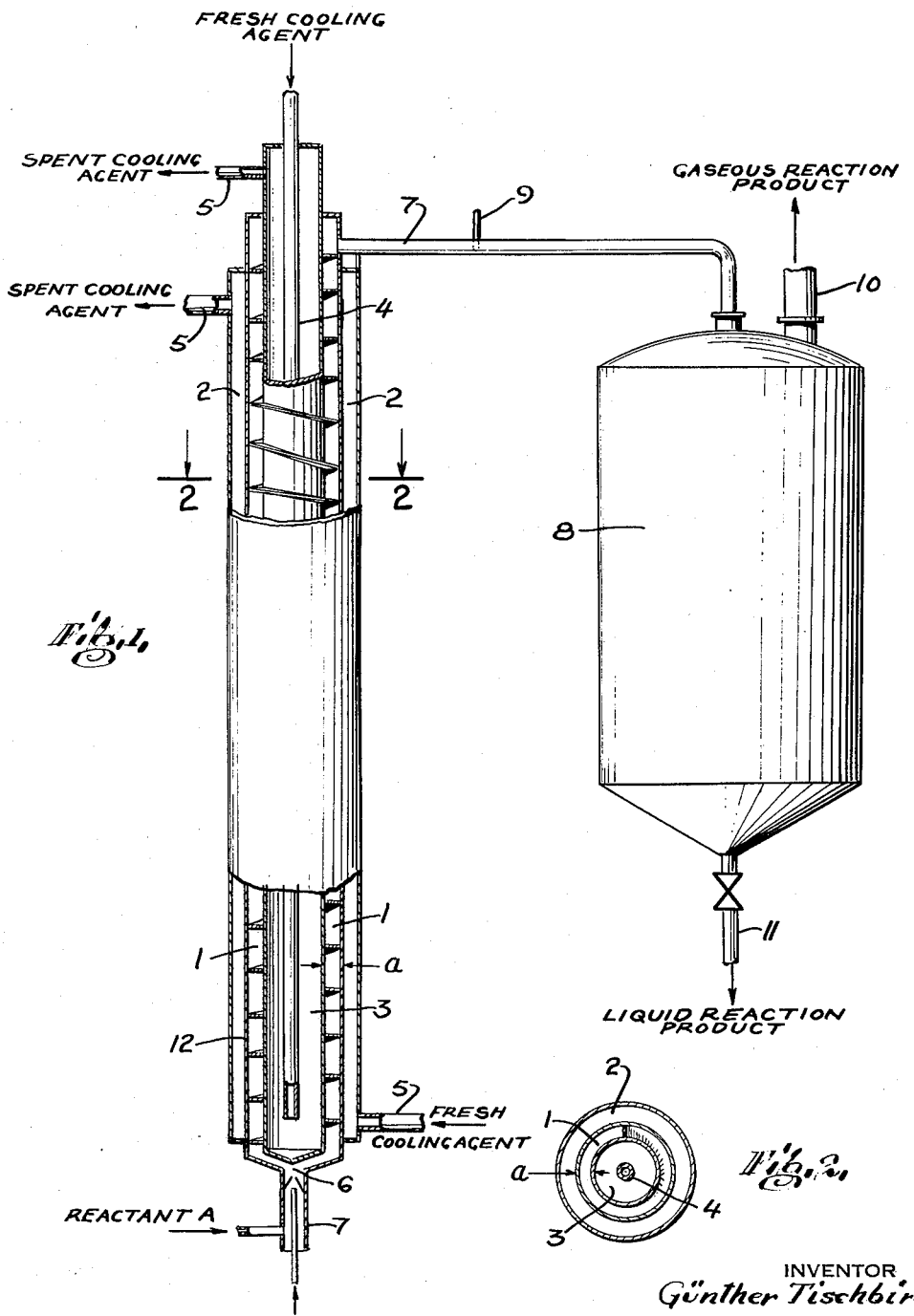

2,931,822

PROCESS AND APPARATUS FOR THE CONTINUOUS PRODUCTION OF SULFURIC ACID ESTERS

Günther Tischbirek, Dusseldorf-Holthausen, Germany, assignor to Henkel & Cie. G.m.b.H., Dusseldorf-Holthausen, Germany, a corporation of Germany Application June 20, 1955, Serial No. 516,559

Claims priority, application Germany June 24, 1954

8 Claims. (Cl. 260—459)

This invention relates to a process and apparatus for the continuous production of sulfuric acid esters of organic hydroxy compounds with the aid of chlorosulfonic acid.

It is well known that in the production of sulfuric acid esters it is more advantageous to employ chlorosulfonic acid instead of sulfuric acid or oleum, because the use of chlorosulfonic acid eliminates the formation of water. Moreover, chlorosulfonic acid is less harsh than sulfuric acid or sulfur trioxide, so that the organic compounds being esterified are less prone to decomposition in the reaction medium. Consequently, the use of chlorosulfonic acid has assumed great importance in the production of sulfuric acid esters on an industrial scale.

The prior art discloses various processes for the continuous production of sulfuric acid esters with the aid of chlorosulfonic acid, but all of these processes have serious disadvantages which render the production difficult and costly and result in low yields. For example, the known methods require that the reaction components remain in contact with each other for relatively long periods of time, which gives rise to yield-reducing and interfering side-reactions. Furthermore, some of the known processes present serious problems of corrosion prevention, particularly those methods which employ air or inert gases for direct cooling of the reaction mixture; small amounts of moisture are inevitably contained in these gaseous coolants, and must be removed therefrom prior to their introduction into the reaction mixture, which requires costly and complicated apparatus. Still further, the processes known to the prior art require the use of apparatus comprising high-speed agitators or stirrers, because low-speed agitators provide an insufficient mixing effect. The high-speed agitating devices are difficult to pack for the purpose of rendering them air-tight, whereby the cost of the apparatus is again increased. Finally, in many cases it is not possible to control the heat of reaction sufficiently by pre-cooling the reactants, since a great number of them which are particularly suitable for esterification with chlorosulfonic acid, for example higher fatty alcohols, have relatively high melting points and solidify when cooled to the required degree.

It is an object of the present invention to provide a process for the continuous production of sulfric acid esters with the aid of chlorosulfonic acid which requires only relatively short contact between the reaction components, whereby the number and extent of yield-reducing and interfering side-reactions are materially lessened and practically completely eliminated.

Another object of this invention is to provide a process for the continuous production of sulfuric acid esters with the aid of chlorosulfonic acid which can be carried out in simple and relatively inexpensive apparatus having no moving parts.

Still another object of the present invention is to provide a process and apparatus for the continuous production of sulfuric acid esters with the aid of chlorosulfonic acid which affords an adequate and yet simple method of controlling the reaction temperature.

Other objects and advantages will become apparent as the description of the invention proceeds.

I have found that these objects and advantages can be achieved and all of the disadvantages of the prior art processes overcome by carrying out the reaction between chlorosulfonic acid and a compound containing suitable alcoholic groups in the apparatus shown in the attached drawing, of which Fig. 1 is a schematic sectional view of the apparatus, and Fig. 2 is a cross-sectional view along line 2—2 of Fig. 1.

The apparatus comprises a narrow annular reaction chamber 1, an exterior cooling jacket 2, an interior cooling chamber 3, and a feed tube 4 for the introduction of a cooling agent into the cooling chamber 3. The exterior cooling jacket 2 and the interior cooling chamber 3 are provided with suitable fittings 5 for the introduction and withdrawal of the cooling agent. The annular reaction chamber 1 narrows at one end into a feed tube 6 which has a mixing nozzle 7, or an equivalent device, inserted therein. The opposite end of chamber 1 is provided with a discharge duct 7 which leads into degasification vessel 8. A thermometer 9 may, if desired, be inserted into duct 7 to determine the temperature of the reaction products flowing therethrough. Vessel 8 is provided with a gas offtake 10 and a discharge duct 11.

The distance "$a$" between the inside surfaces of reaction chamber 1 should be relatively small, preferably about 3 to 4 mm., and chamber 1 may additionally be provided with spiral partitions or guide surfaces 12 to improve the cooling and mixing effects upon the components of the reaction mixture fed into chamber 1 through mixing nozzle 7.

With the aid of this apparatus, the continuous production of sulfuric acid esters is carried out as follows:

The reactants, chlorosulfonic acid and, for example, a fatty alcohol mixture, are separately introduced into the mixing nozzle in approximately equimolar ratio and at high linear velocities to assure rapid and thorough admixture. Both reactants are free from air or inert gases. From the mixing nozzle the reaction mixture passes into the constricted annular reaction chamber. The hydrochloric acid gas formed by the reaction between chlorosulfonic acid and the fatty alcohol mixture further homogenizes the reaction mixture and tends to accelerate the passage of the reaction mixture through the annular reaction chamber. The velocity of the reactants entering through the mixing nozzle should be such that the reaction mixture remains in the annular chamber for no more than 2 minutes, but preferably less than 30 seconds. The periods of time are based upon the liquid phase in the reaction mixture; i.e., upon the fatty alcohol sulfuric acid ester contained in the mixture. The gaseous hydrochloric acid formed by the reactants, however, tends to pass through the annular chamber more rapidly, and, if both the gaseous and the liquid phases of the reaction mixture form the basis for these periods of time, the reaction mixture should not remain in the annular chamber for longer periods than 1/10 of the periods above stated.

The reaction chamber is cooled by circulating a cooling liquid or fluid, such as water, through cooling jacket 2 and chamber 3, preferably in concurrent fashion. It is advantageous to maintain the temperature of the cooling fluid a few degrees, for example 3 to 5° C., below the desired temperature of the reaction mixture flowing through duct 7.

The reaction may, however, also be carried out by passing the reaction mixture through two or more of the tubes described above which are arranged in series. In that case, the first tube should be cooled to a greater extent, while the last tube should be cooled so as to bring the temperature of the reaction mixture to the desired discharge temperature.

In either case, the cooling and mixing effects may be further increased by providing additional shaped conduits in entrance duct 6 of the reaction chamber which further constrict the path of the reaction mixture. In addition, guide surfaces 12 may be constructed as capillaries to permit cooling liquid to circulate therethrough, whereby the cooling effect can be further improved.

The temperature at which the reaction is most advantageously carried out depends largely upon the melting point and the viscosity of the compound to be esterified with chlorosulfonic acid. In general, that temperature lies between 0 and 60° C. for the esterification of fatty alcohols the temperature of the reaction mixture should preferably not exceed about 30° C. If materials are to be esterified which have a higher melting point than 30° C., the reaction temperature should be about 5° C. higher than the melting point of the material to be esterified with chlorosulfonic acid. In those cases, however, it is particularly advantageous to pre-cool the chlorosulfonic acid reactant prior to its introduction into the mixing nozzle. The temperature to which the chlorosulfonic acid should be pre-cooled depends largely upon the physical properties of the substance to be esterified and upon the amount of heat of reaction to be removed in order to achieve the most advantageous reaction temperature. Of course, it is also possible to dissolve the individual reactants separately in inert solvents, such as non-aromatic saturated hydrocarbons or halogenated hydrocarbons, preferably those of a boiling point up to 150° C. and to introduce these solutions into the mixing nozzle. However, this is not an essential measure and it is, in fact, preferred not to operate with such solutions.

After the reaction mixture has passed through the annular reaction chamber, the mixture of gaseous hydrochloric acid and fatty alcohol sulfuric acid esters is withdrawn at the top and passed through duct 7, past thermometer 9, if desired, into degasification vessel 8, where the liquid phase, i.e. the sulfuric acid esters, readily separates from the gaseous hydrochloric acid. This separation can be aided, for example by atomizing the reaction products issuing from duct 7 with the aid of an atomizing nozzle or by applying a reduced or atmospheric pressure draft to gas offtake 10.

The sulfuric acid esters are continuously withdrawn from vessel 8 through pipe 11, while the hydochloric acid gas is recovered through offtake 10. The hydrochloric acid gas thus obtained is dry and pure; it may immediately be reacted again with sulfur trioxide in accordance with known methods to form chlorosulfonic acid, which, in turn, is recycled into the system as the esterification component, as above described.

The sulfuric acid esters produced with the aid of the process and the apparatus in accordance with the present invention are colorless and of excellent quality, and the yields are practically theoretical. Since the process obviates the introduction of inert gases and the like with the reaction components, the prerequisite conditions for the occurrence of corrosion are completely eliminated, because no matter how thoroughly a gas is dried it still contains small amounts of moisture which would combine with the hydrochloric acid gas to form highly corrosive liquid hydrochloric acid. Moreover, the present process provides for strong cooling conditions and only very short periods of time within which the reaction components are in contact with each other, so that yield-reducing and interfering side-reactions are practically completely eliminated, which leads to very high, practically 100% yields. Finally, the sulfuric acid esters produced in accordance with my novel process contain only very minute amounts of inorganic salts.

The advantages of the above-described apparatus are manifold; however, they principally reside in the absence of moving parts, such as high-speed stirrers or agitators, which reduces the chances of breakdown to a very minimum, and the excellent space-time-yield relationship brought about by the comparatively short periods of time during which the reactants remain in the reaction chamber.

The present process and apparatus are excellently adapted for use in esterifying compounds of any kind containing suitable alcoholic groups, and particularly for esterifying fatty alcohols, polyglycol ethers or the corresponding ethyleneoxide condensation products, especially those having high melting points, with chlorosulfonic acid. The above-described process may, of course, be combined with known continuous processes for neutralizing or transforming the sulfuric acid esters produced thereby into the corresponding sulfuric acid salts.

The following examples will further illustrate my invention and enable others skilled in the art to understand the invention more completely. It is understood, however, that the present invention is not limited to these specific examples.

*Example I*

A mixture of fatty alcohols having from 12 to 18 carbon atoms in the carbon chain and a melting point of 25° C. was continuously introduced together with chlorosulfonic acid in equimolar ratio at high velocity into the reaction chamber of the above-described apparatus through a suitable mixing nozzle. The temperature of the entering fatty alcohols was 30° C. and that of the chlorosulfonic acid was —20° C. The velocity of the entering reactants was adjusted so that the reaction mixture passed through the reaction chamber within about 15 seconds. The temperature and rate of flow of the cooling fluid were such that the reaction products issued from the top of the apparatus at a temperature of about 25° C. From the reaction chamber the products were passed into the degasification vessel where the gaseous hydrochloric acid separated from the liquid fatty alcohol sulfuric acid ester in practically quantitative amounts. The hydrochloric acid gas was withdrawn from the degasification vessel, reacted with sulfur trioxide to form more chlorosulfonic acid which was then recycled into the system through the mixing nozzle. The liquid fatty alcohol sulfuric acid esters were continuously withdrawn from the bottom of the degasification vessel in practically analytically pure form. The yield was virtually 100% of the theoretical yield.

*Example II*

A mixture of fatty alcohols having from 16 to 18 carbon atoms in the carbon chain and a melting point of about 51° C. was continuously introduced together with chlorosulfonic acid (5 mol percent excess) in the above-described apparatus as in Example I. The temperature of the entering fatty alcohol mixture was 60° C. and that of the chlorosulfonic acid was —25° C. The temperature and rate of flow of the cooling fluid were such that the reaction products issued from the top of the apparatus at a temperature of about 50° C. In the degasification vessel the hydrochloric acid gas separated from the liquid phase virtually quantitatively and was retransformed into chlorosulfonic acid as in Example I. The fatty alcohol sulfuric acid esters were continuously withdrawn from the bottom of the degasification vessel and then neutralized with sodium hydroxide, whereby a colorless paste was formed. The paste had a fatty alcohol sulfonate content of 35% and a sodium chloride content of 0.6%. The degree of sulfonation was 98.5%.

Example III

A mixture of fatty alcohols having from 16 to 18 carbon atoms in the carbon chain was subjected to a condensation reaction with 2 mols ethyleneoxide in accordance with known methods. The resulting ethyleneoxide condensation product was continuously introduced together with chlorosulfonic acid in equimolar ratio at high velocity into the reaction chamber of the above-described apparatus with the aid of a suitable mixing nozzle. The temperature of the entering ethyleneoxide condensation product was 40° C. and that of the chlorosulfonic acid was −20° C. The temperature and rate of flow of the cooling liquid were such that the reaction products issuing from the top of the apparatus were at a temperature of about 55° C. The reaction products were passed into a degasification vessel where the hydrochloric acid gas was removed from the liquid phase, as described in the preceding examples. The liquid phase was continuously withdrawn from the bottom of the vessel and neutralized with dilute sodium hydroxide to form a practically colorless paste having a fatty alcohol sulfonate content of 30% and a sodium chloride content of 0.4%. The degree of sulfonation was 100%.

While I have given specific embodiments of my invention, it is understood that the present invention is not limited to these embodiments and that certain changes and modifications can be made therein without departing from the spirit of my invention or from the scope of the appended claims.

I claim:

1. The process of continuously producing sulfuric acid esters of higher aliphatic organic compounds containing alcoholic groups which comprises continuously and intimately admixing said organic compounds with chlorosulfonic acid, continuously passing said mixture at high velocity through a relatively narrow reaction space not greater than about 1 cm. in width within a period of less than 2 minutes, cooling said mixture while in said reaction space to a temperature slightly above the melting point of the aliphatic compound, continuously withdrawing the resulting reaction products from said reaction space, and continuously separating the gaseous reaction product from the liquid reaction products.

2. The process of continuously producing sulfuric acid esters of higher aliphatic organic compounds containing alcoholic groups which comprises continuously and intimately admixing substantially equimolar amounts of said organic compounds and chlorosulfonic acid, continuously passing said mixture through a relatively narrow reaction space not greater than about 1 cm. in width within a period of from 15 seconds to 2 minutes, cooling said mixture while in said reaction space to a temperature slightly above the melting point of the reaction products formed thereby, continuously withdrawing the reaction products from said reaction space, and continuously separating the gaseous reaction product from the liquid reaction products.

3. The process of continuously producing sulfuric acid esters of organic compounds selected from the group consisting of fatty alcohols, polyglycol ethers and their corresponding ethyleneoxide condensation products, which comprises continuously and intimately admixing substantially equimolar amounts of said organic componds and chlorosulfonic acid, continuously passing said mixture through a relatively narrow reaction space not greater than about 1 cm. in width within a period of from 15 seconds to 2 minutes, cooling said mixture while in said reaction space to a temperature between 0 and 60° C., continuously withdrawing the reaction products formed thereby from said reaction space, and continuously separating the gaseous reaction product from the liquid reaction products.

4. The process of continuously producing sulfuric acid esters of fatty alcohols which comprises continuously and intimately admixing substantially equimolar amounts of finely divided fatty alcohols and finely divided chlorosulfonic acid, continuously passing said mixture through a relatively narrow reaction space not greater than about 1 cm. in width within a period of about 15 seconds to 2 minutes, whereby substantially theoretical amounts of fatty alcohol sulfuric acid esters and hydrochloric acid are formed, cooling said mixture while in said reaction space to a temperature about 5° C. above the melting point of the fatty alcohols and not exceeding 50° C., continuously withdrawing said reaction products from said reaction space, and continuously separating the hydrochloric acid from the fatty alcohol esters.

5. The process of continuously producing sulfuric acid esters of fatty alcohols having from 12 to 18 carbon atoms in the carbon chain, which comprises continuously and intimately admixing substantially equimolar amounts of finely divided fatty alcohols having from 12 to 18 carbon atoms in the carbon chain and finely divided chlorosulfonic acid, said chlorosulfonic acid being at a temperature of about −25° C., continuously passing said mixture through a relatively narrow reaction space not greater than about 1 cm. in width within a period of about 15 seconds, whereby substantially theoretical amounts of fatty alcohol sulfuric acid esters and hydrochloric acid are formed, cooling said mixture while in said reaction space to a temperature not exceeding 50° C., continuously withdrawing said reaction products from said reaction space, and continuously separating the hydrochloric acid from the fatty alcohol esters.

6. The process of continuously producing sulfuric acid esters of fatty alcohol ethyleneoxide condensation products which comprises continuously and intimately admixing substantially equimolar amounts of chlorosulfonic acid and the ethyleneoxide condensation product of fatty alcohols having from 16 to 18 carbon atoms in the carbon chain, continuously passing said mixture through a relatively narrow reaction space not greater than about 1 cm. in width within a period of about 15 seconds, continuously withdrawing the resulting reaction products from the reaction space at a temperature of about 55° C., and continuously separating the gaseous reaction product from the liquid reaction products.

7. The process of continuously producing sulfuric acid esters of higher aliphatic organic compounds containing alcoholic groups which comprises continuously and intimately admixing said organic compounds with chlorosulfonic acid, continuously passing said mixture through an elongated annular reaction chamber, wherein the distance between the interior surfaces of said reaction chamber is less than about 1 cm., at a flow rate such that the mixture remains in the reactor for a period of less than about 12 seconds based on both the gaseous and liquid phases of the reaction mixture, continuously withdrawing the resulting reaction products from the reaction chamber at a temperature not exceeding about 5° C. above the melting point of said higher aliphatic organic compounds, and continuously separating the gaseous reaction product from the reaction products.

8. The process of continuously producing sulfuric acid esters of higher aliphatic organic compounds containing alcoholic groups which comprises continuously and intimately admixing said organic compounds with chlorosulfonic acid, continuously passing said mixture through an elongated annular reaction chamber, wherein the distance between the interior surfaces of said reaction chamber is less than about 1 cm., at a flow rate such that the mixture remains in the reactor for a period of less than about 12 seconds based on both the gaseous and liquid phases of the reaction mixture, maintaining a cooling medium in contact with the exterior surfaces of said chamber, continuously withdrawing the resulting reaction products from the reaction chamber at a temperature not exceeding about 5° C. above the melting point of said higher aliphatic organic compounds, and continuously separating the gaseous reaction product from the reaction products.

References Cited in the file of this patent

UNITED STATES PATENTS

| | | |
|---|---|---|
| 2,187,244 | Mills | Jan. 16, 1940 |
| 2,326,270 | Werntz | Aug. 10, 1943 |
| 2,395,777 | Brunjes et al. | Feb. 26, 1946 |
| 2,453,837 | Fisher et al. | Nov. 16, 1948 |
| 2,673,211 | Blinoff | Mar. 23, 1954 |
| 2,771,484 | Blaser et al. | Nov. 20, 1956 |